United States Patent
Gupta et al.

(10) Patent No.: US 12,490,218 B2
(45) Date of Patent: Dec. 2, 2025

(54) SELF-ORGANIZING NETWORK CELL REGISTRATION AND MISMATCH RESOLUTION METHOD AND APPARATUS

(71) Applicant: Rakuten Mobile, Inc., Tokyo (JP)

(72) Inventors: Rahul Gupta, Indore (IN); Aaditya Dharampurikar, Indore (IN); Ashutosh Das, Indore (IN); Anurag Mahajan, Indore (IN); Akash Gupta, Indore (IN)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/999,212

(22) PCT Filed: Sep. 22, 2022

(86) PCT No.: PCT/US2022/044345
§ 371 (c)(1),
(2) Date: Nov. 18, 2022

(87) PCT Pub. No.: WO2024/063775
PCT Pub. Date: Mar. 28, 2024

(65) Prior Publication Data
US 2024/0236907 A1 Jul. 11, 2024

(51) Int. Cl.
*H04W 60/04* (2009.01)
*H04W 24/02* (2009.01)
*H04W 84/18* (2009.01)

(52) U.S. Cl.
CPC ........... *H04W 60/04* (2013.01); *H04W 24/02* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 10,367,690 B2* | 7/2019 | Sanneck | H04L 41/142 |
| 2012/0276899 A1* | 11/2012 | Kolding | H04W 24/02 455/435.1 |
| 2015/0223287 A1* | 8/2015 | On | H04W 24/02 370/254 |
| 2017/0244806 A1* | 8/2017 | Tang | H04L 67/61 |

(Continued)

*Primary Examiner* — Hashim S Bhatti
*Assistant Examiner* — Ahmed Saifuddin
(74) *Attorney, Agent, or Firm* — HAUPTMAN HAM, LLP

(57) ABSTRACT

A method includes causing an electronic self-organizing network (eSON) general-purpose remote procedure call (gRPC) client to register a first cell in a communication network. The first cell is registered on an eSON gRPC server. The method also includes causing first information associated with the first cell to be processed by the eSON gRPC server to determine whether a mismatch exists between the first cell and a second cell in the communication network. The method further includes, in response to receiving a first message indicating the mismatch exists from the eSON gRPC server, sending a second message indicating the mismatch exists to an operational support system (OSS) to cause the OSS to generate a change request to be communicated to a network configuration controller for changing a network function implemented by a network device corresponding to one of the first cell or the second cell to resolve the mismatch that exists.

20 Claims, 4 Drawing Sheets

(56) References Cited

U.S. PATENT DOCUMENTS

| | | | |
|---|---|---|---|
| 2020/0045565 A1* | 2/2020 | Tanna | H04W 52/346 |
| 2021/0243592 A1* | 8/2021 | Chou | H04W 24/02 |
| 2023/0188417 A1* | 6/2023 | Banerjee | H04L 41/0823 |
| | | | 709/221 |

* cited by examiner

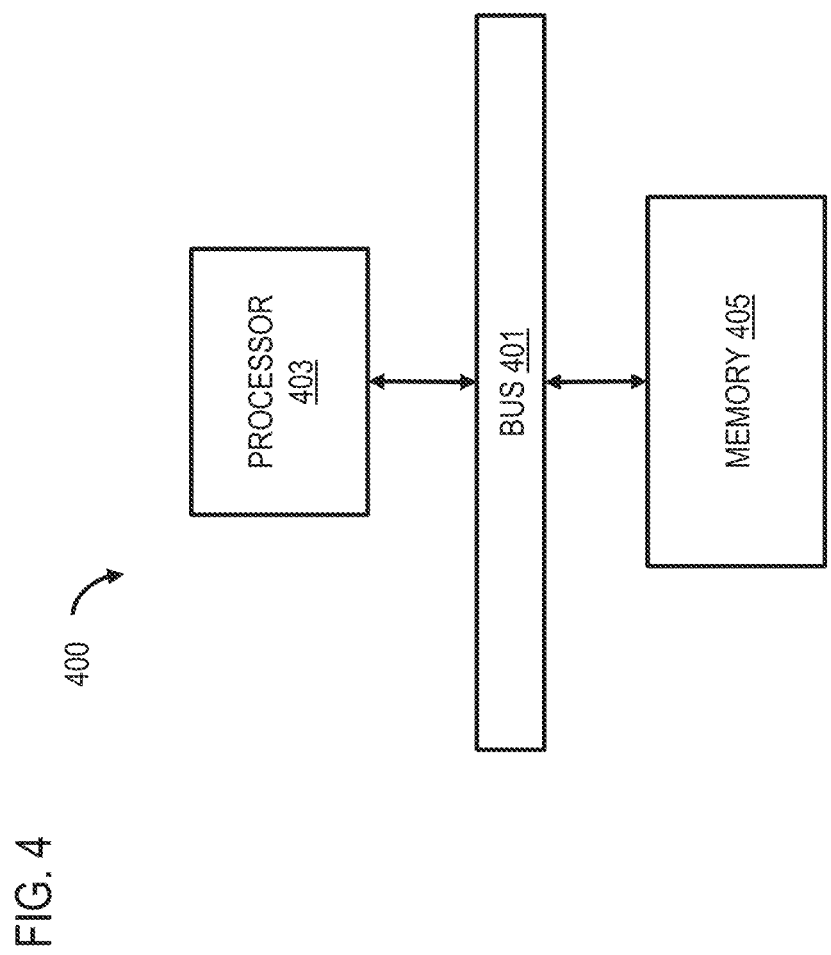

SELF-ORGANIZING NETWORK CELL REGISTRATION AND MISMATCH RESOLUTION METHOD AND APPARATUS

TECHNICAL FIELD

The present disclosure is related to mismatch resolution in a self-organizing network.

BACKGROUND

Network operators, network service providers and device manufacturers (e.g., wireless, cellular, etc.) are continually challenged to deliver value and convenience to consumers by, for example, providing compelling communication networks and network services that are dependable and capable of being flexibly constructed, scalable, diverse, and economically operated.

SUMMARY

An aspect of this description is related to a method comprising causing, by a processor, an electronic self-organizing network (eSON) general-purpose remote procedure call (gRPC) client to register a first cell in a communication network. The first cell is registered on an eSON gRPC server communicatively coupled with the eSON gRPC client. The method also comprises causing first information associated with the first cell to be processed by the eSON gRPC server to determine whether a mismatch exists between the first cell and a second cell in the communication network. The mismatch is determined by the eSON gRPC server based on a comparison of the first information with second information associated with the second cell. The method further comprises, in response to receiving a first message indicating the mismatch exists from the eSON gRPC server, sending a second message indicating the mismatch exists to an operational support system (OSS) to cause the OSS to generate a change request to be communicated to a network configuration controller for changing a network function implemented by a network device corresponding to one of the first cell or the second cell to resolve the mismatch that exists. The change request is based on resolution information generated by the eSON gRPC server in response to determining the mismatch exists.

Another aspect of this description is related to an apparatus, comprising a processor and a memory having instructions stored thereon that, when executed by the processor, cause the apparatus to cause an eSON gRPC client to register a first cell in a communication network. The first cell is registered on an eSON gRPC server communicatively coupled with the eSON gRPC client. The apparatus is also caused to cause first information associated with the first cell to be processed by the eSON gRPC server to determine whether a mismatch exists between the first cell and a second cell in the communication network. The mismatch is determined by the eSON gRPC server based on a comparison of the first information with second information associated with the second cell. The apparatus is further caused to, in response to receiving a first message indicating the mismatch exists from the eSON gRPC server, send a second message indicating the mismatch exists to an OSS to cause the OSS to generate a change request to be communicated to a network configuration controller for changing a network function implemented by a network device corresponding to one of the first cell or the second cell to resolve the mismatch that exists. The change request is based on resolution information generated by the eSON gRPC server in response to determining the mismatch exists.

Another aspect of this description is related to a non-transitory computer readable having instructions stored thereon that, when executed by a processor, cause an apparatus to cause an eSON gRPC client to register a first cell in a communication network. The first cell is registered on an eSON gRPC server communicatively coupled with the eSON gRPC client. The apparatus is also caused to cause first information associated with the first cell to be processed by the eSON gRPC server to determine whether a mismatch exists between the first cell and a second cell in the communication network. The mismatch is determined by the eSON gRPC server based on a comparison of the first information with second information associated with the second cell. The apparatus is further caused to, in response to receiving a first message indicating the mismatch exists from the eSON gRPC server, send a second message indicating the mismatch exists to an OSS to cause the OSS to generate a change request to be communicated to a network configuration controller for changing a network function implemented by a network device corresponding to one of the first cell or the second cell to resolve the mismatch that exists. The change request is based on resolution information generated by the eSON gRPC server in response to determining the mismatch exists.

BRIEF DESCRIPTION OF DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 4 is a functional block diagram of a computer or processor-based system upon which or by which an embodiment is implemented.

DETAILED DESCRIPTION

Figure 1:
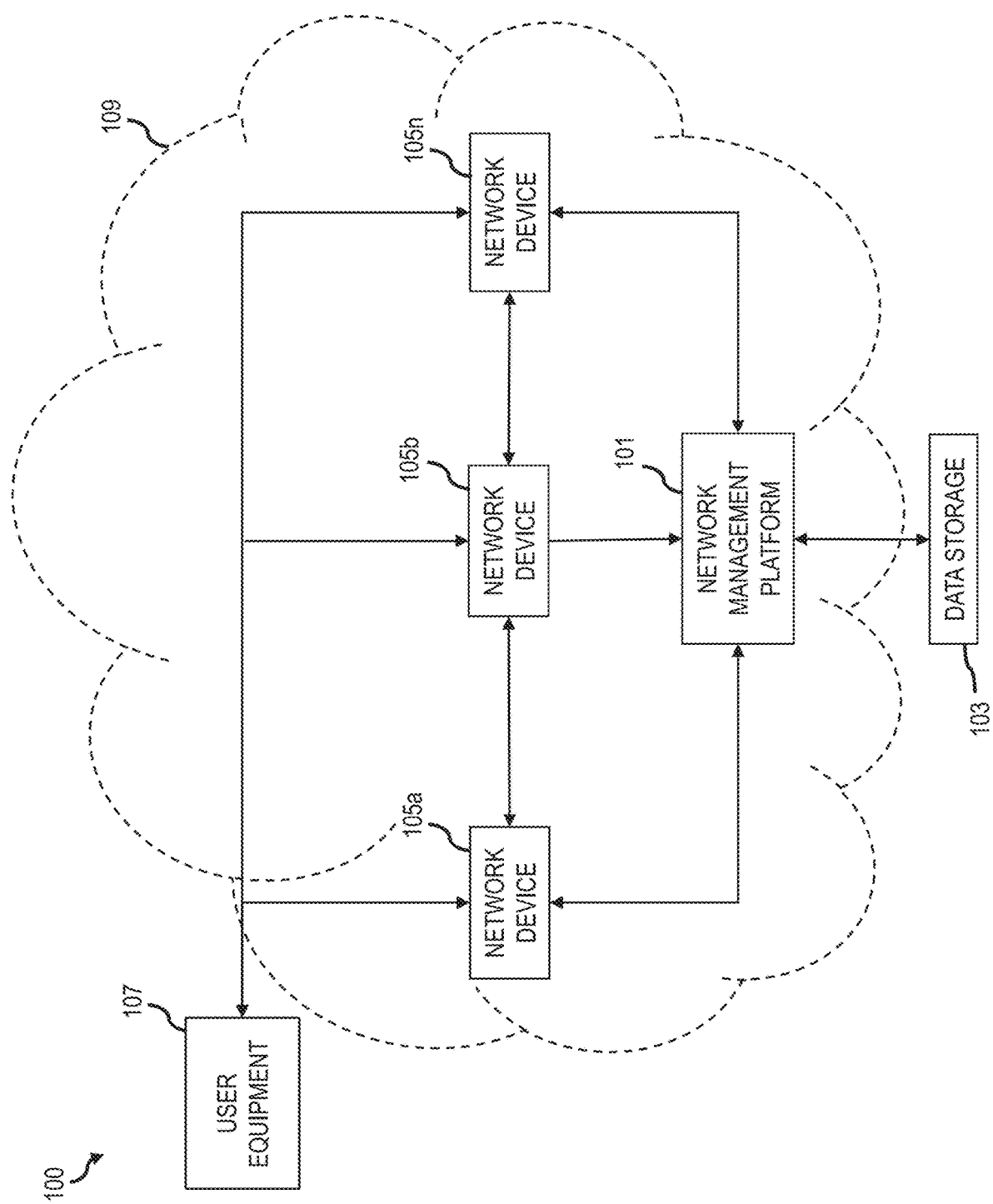
FIG. 1 is a diagram of a communication system, in accordance with one or more embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation or position of a first feature over or on a second feature in the description that follows may include embodiments in which the first and second features are formed or positioned in direct contact, and may also include embodiments in which additional features may be formed or positioned between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of an apparatus or object in use or operation in addition to the orientation depicted in the figures. The apparatus may be otherwise oriented (rotated 90 degrees or at other orientations) and the spatially relative descriptors used herein may likewise be interpreted accordingly.

Communication networks and network services are often provided by static or inflexible systems that are difficult to configure, scale, and deploy over various target areas. Dependable provision of communication networks and/or network services that are capable of being flexibly constructed, scalable and diverse is often reliant on the resolution of mismatches that are identified among cells that are added to a communication network.

Network operators coordinate and deploy communication networks that include network services (e.g., hardware, software, etc.) provided by one or more network service providers. Such communication networks often involve network services across multiple domains such as radio area network (RAN), base station subsystem (BSS), platform, core network, etc., various technologies (such as 3G, 4G, LTE, 5G, etc.), multiple locations, various software interfaces, multiple devices, etc. that are proprietary and/or optimized by a specific network service provider.

As the communication network evolves and improves, a single communication network may involve an ever-changing quantity of network service providers for providing network services and/or that are associated with providing network services associated with various aspects of the communication network (e.g., domains, technologies, locations of services, network devices, etc.) and, as a result, the state of the communication network may vary dynamically with the addition and/or subtraction of network service providers, a change in one or more network services, one or more network devices, etc.

A communication network may contain a large quantity of cells provided by one or more network service providers that employ numerous network devices. Each cell has a physical cell identity (PCI). Sometimes, a same PCI is used by different cells. However, user equipment such as a mobile device that has connectivity to the communication network cannot distinguish between two cells if both cells have the same PCI, resulting in a PCI mismatch. A PCI mismatch may be a PCI conflict, a PCI collision, a PCI confusion, or the like. Sometimes, a PCI mismatch also involves a same frequency among neighboring cells. For example, a PCI confusion may occur when a cell has two different neighbor cells with equal PCIs and frequency, and/or a cell has a neighbor cell with an identical PCI and frequency.

PCI mismatches often result in an increase in lost connectivity to the communication network, causing dropped calls, slow or no data transfer, increased channel interference, etc., which may occur when a handover between cells fails, the communication network is updated and/or one or more cells are added or removed to or from the communication network, for example.

Similarly, a root sequence index (RSI) mismatch is problematic for user equipment. For example, when user equipment is activated, the user equipment scans a radio network for frequencies corresponding to a communication network to which the user equipment has connectivity. After the user equipment is synchronized to a frequency, the user equipment verifies that the user equipment is connected to the right communication network by reading a master information block as well as system information blocks that contain an RSI which indicates the index of the logical root sequence in order to derive a physical random access channel preamble sequence to start a random-access procedure. The random-access procedure is used for service connection establishment and re-establishment, intrasystem handovers and user equipment synchronization for uplink and downlink data transfers. However, if two or more neighbor cells operate in the same frequency band and have the same RSI, there is a higher occurrence of preamble collision among the requests coming from various other UEs, resulting in an RSI mismatch. An RSI mismatch may be, for example, an RSI collision. RSI mismatches often lead to an increase of failed service establishments and re-establishments as well as an increase of failed handovers between cells, and/or when the communication network is updated and/or one or more cells are added or removed to or from the communication network, for example.

FIG. 1 is a diagram of a communication system 100, in accordance with one or more embodiments.

System 100 makes it possible to automatically resolve PCI and/or RSI mismatches that are determined to exist when a cell in the communication network is registered.

System 100 comprises network management platform 101, data storage 103, one or more network devices 105a-105n (collectively referred to as network devices 105), and user equipment (UE) 107. Network management platform 101, data storage 103, the one or more network devices 105, and/or UE 107 are communicatively coupled by way of a communication network 109. In some embodiments, the communication network 109 is orchestrated by the network management platform 101 which combines a plurality of network services provided by one or more network service providers via the network devices 105. In some embodiments, the network management platform 101 is a network orchestrator that implements the communication network 109. In some embodiments, the network management platform 101 is a portion of a network orchestrator that implements the communication network 109.

In some embodiments, network management platform 101 comprises a set of computer readable instructions that, when executed by a processor such as a processor 403 (FIG. 4), causes network management platform 101 to perform the processes discussed in accordance with one or more embodiments.

Network management platform 101 comprises one or more of an electronic self-organizing network (eSON) general-purpose remote procedure call (gRPC) client, an eSON gRPC server, a network configuration controller, and an operational support system (OSS). In some embodiments, the OSS comprises a continuous monitoring as a service (CMaaS) module.

In some embodiments, network management platform 101 is remote from the network devices 105. In some embodiments, the network management platform 101 is at least partially implemented by a UE 107. In some embodiments, network management platform 101 is a part of one or more of the network devices 105. In some embodiments, one or more processes the network management platform 101 is configured to perform and/or components of the network management platform 101 is divided among one or more of the network devices 105, one or more UE 107's and/or one or more processors remote from the one or more network devices 105 and/or the one or more UE 107's.

For example, in some embodiments, the eSON gRPC client and the eSON gRPC server are implemented by a single computer having connectivity to the communication network 109. In some embodiments, the eSON gRPC client and the eSON gRPC are divided among at least two computing devices. In some embodiment the eSON gRPC client is executed by way of one or more network devices 105 and/or one or more UE 107's and the eSON server is executed by one of the one or more UE 107's or some other computer remote from the UE 107's and the one or more network devices 105, or some other suitable combination of network elements. In some embodiments, the network configuration controller is implemented by the same single computer or UE 107 as one or both of the eSON gRPC client and the eSON gRPC server, a different computer or UE 107. In some embodiments, the network configuration controller is outside the network management platform 101 and is associated with one or more network service providers associated with a cell and/or certain network devices 105 as an intermediary between the network devices 105 and the network management platform 101.

In some embodiments, data storage 103 has searchable information stored therein that includes stored information associated with the communication network 109 such as network device 105 identifiers, physical cell identities (PCIs), frequency information, root sequence indexes, preamble information, key performance indicator (KPI) data, or other suitable system data.

Data storage 103 is a memory such as a memory 405 (FIG. 4) capable of being queried or caused to store data in accordance with one or more embodiments. In some embodiments, the network management platform 101 and the data storage 103 together form a network orchestrator that implements the communication network 109.

Network management platform 101 is configured to automatically resolve PCI and/or RSI mismatches that are determined to exist when a cell in the communication network 109 is registered in the eSON gRPC server. Resolving PCI and/or RSI mismatches automatically by way of the eSON gRPC client and the eSON gRPC server helps to improve network dependability while enhancing the scalability of the communication network by resolving problematic PCI and/or RSI mismatches in a timely and cost-effective manner while reducing an impact on system resources. For example, by employing the eSON gRPC client and the eSON gRPC server to resolve identified PCI and/or RSI mismatches, a network operator is able to readily add and/or remove one or more cells provided to the communication network by one or more network service providers quickly and/or to facilitate smooth handovers of user equipment moving between cells without relying on manual processes that increase response time, increase costs, and reduce user confidence in the dependability of the communication network.

In use, the eSON gRPC client is caused to register a first cell comprising one or more network devices 105 in the communication network 109. For ease of understanding the embodiments discussed in this description, a first cell refers to any cell of two or more cells included in the communication network 109. The first cell is registered on the eSON gRPC server. The eSON gRPC server is communicatively coupled with the eSON gRPC client. In some embodiments, to register the first cell, the eSON gRPC client sends a cell registration message to the eSON gRPC server. The cell registration message comprises first information associated with the first cell. In some embodiments, the first information is a PCI of the first cell or an RSI of the first cell, or other suitable data associated with the first cell. In some embodiments, the cell registration message is sent from the eSON gRPC client to the eSON gRPC server by way of a gRPC application programming interface (API) by way of a remote procedure call. In some embodiments, the cell registration message is sent from the eSON gRPC client to the eSON gRPC server by way of an add neighbor API of the gRPC client. In some embodiments, the cell registration message is sent from the eSON gRPC client to the eSON gRPC server by way of a remove neighbor API of the gRPC client.

Network management platform 101 causes the eSON gRPC server to process the first information associated with the first cell to determine whether a mismatch exists between the first cell and a second cell in the communication network 109. For ease of understanding the embodiments discussed in this description, a second cell refers to any cell of the two or more cells included in the communication network 109 other than the first cell. The mismatch is determined by the eSON gRPC server based on a comparison of the first information with second information associated with the second cell. In some embodiments, the second information comprises a PCI of the first cell or an RSI of the second cell, or other suitable data associated with the second cell. The second cell is implemented by one or more other network devices 105 of the communication network 109. In some embodiments, the eSON gRPC server queries the data storage 103 for the second information associated with the second cell for comparison and/or processing for determining whether a mismatch exists.

In some embodiments, the mismatch is a PCI mismatch based on a comparison and/or processing of the PCI of the first cell and a PCI of the second cell. In some embodiments, the mismatch is an RSI mismatch based on a comparison and/or processing of the RSI of the first cell and the RSI of the second cell. In some embodiments, the first cell and the second cells are neighboring cells, and the first cell is added or removed by way of a neighbor relation table. In some embodiments, the eSON gRPC server is configured to execute one or more self-organizing network (SON) algorithms to optimize network services provided by the communication network 109. In some embodiments, a determination that a mismatch exists is based on executing at least one SON algorithm corresponding to the type of mismatch that may occur based on the type of first information (e.g., PCI of the first cell and/or RSI of the first cell) received by way of the corresponding API.

In response to determining that a mismatch exists, the eSON gRPC server generates resolution information that is communicated to the eSON gRPC client in a first message to the eSON gRPC client to indicate that the mismatch exists and provide an instruction indicating how to resolve the mismatch. In some embodiments, the resolution information is a suggestion regarding how to resolve the mismatch. In some embodiments, the resolution information indicates that the first information of the first cell or the second information of the second cell is to be changed to resolve the mismatch. For example, a PCI may be changed to avoid a situation in which a same PCI is used among multiple cells, or a preamble may be changed to avoid an RSI conflict among neighboring cells, etc.

Then, in response to receiving the first message from the eSON gRPC server indicating the mismatch exists and including the resolution information, the eSON gRPC client sends a second message indicating the mismatch exists and including the resolution information to the OSS to cause the OSS to generate a change request to be communicated to the network configuration controller for changing a network function implemented by one or more of the network devices 105 corresponding to one of the first cell or the second cell to resolve the mismatch that exists. The change request is based on the resolution information generated by the eSON gRPC server in response to determining the mismatch exists.

The change request is sent to the network configuration controller to facilitate execution of the changes to change the network function implemented by the one or more network devices corresponding to the first cell or the second cell resolve the mismatch and push the change to the one or more network devices 105 corresponding to the first cell or the second cell.

The one or more network devices 105, having executed the change according to the change request, send a change success message to the network configuration controller. The network configuration controller then sends a message to the OSS indicating that the change was successful in response to receiving the successful change message from the one or more network devices 105 that executed the change. The OSS, in response to receiving the successful change message from the network configuration controller, sends a message to the eSON gRPC client indicating the change request has been executed by the network configuration controller and the changing of the network function to resolve the mismatch was successful. In some embodiments, the message received by the eSON gRPC client from the OSS is a third message that comprises updated first information or updated second information based on which one of the first cell or the second cell includes the network device that implements the network function which was changed.

In response to receiving and processing the third message, the eSON gRPC client sends a fourth message to the eSON gRPC server indicating the changing of the network function to resolve the mismatch was successful. In some embodiments, the fourth message comprises the updated first information or the updated second information to cause the eSON gRPC server to store the updated first information or the updated second information in data storage 103 for a future mismatch determination process such as when a cell is to be registered, added, removed, or some other suitable process for which the updated first information or the updated second information stored in the data storage 103 is usable.

Figure 2:
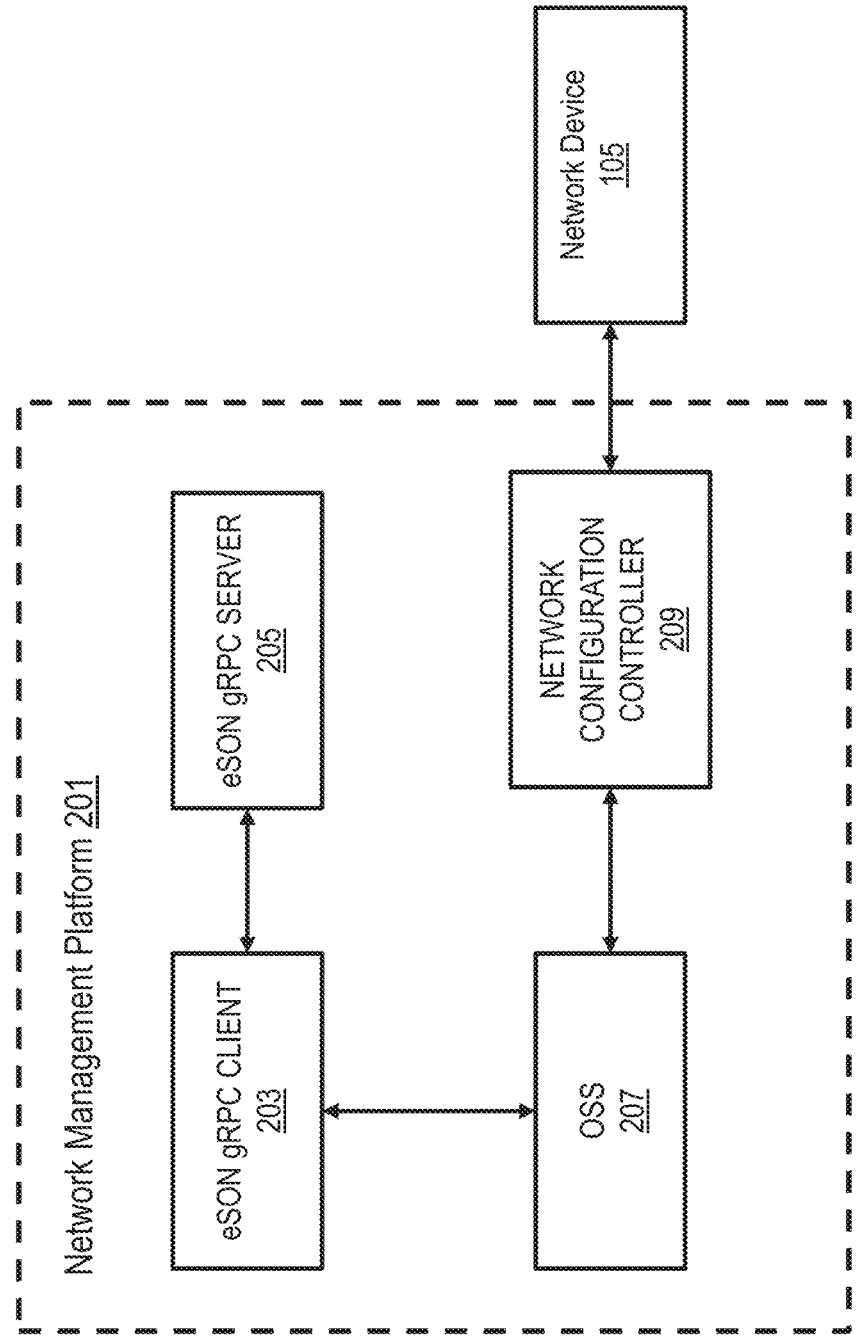
FIG. 2 is a diagram of a network management platform, in accordance with one or more embodiments.

FIG. 2 is a diagram of network management platform 201, in accordance with one or more embodiments. Network management platform 201 is an example embodiment of network management platform 101 (FIG. 1). Network management platform 201 comprises eSON gRPC client 203, eSON gRPC server 205, OSS 207 and network configuration controller 209. In some embodiments, the communications between the components of the network management platform 101 and between the network management platform 101 and the network devices 105 employ various APIs and protocols such that either side of an interface or protocol can be pre-processed or post-processed before consumption and processing by a receiving component.

Network configuration controller 209 is configured to send and receive messages to and from the network devices 105 to facilitate changes to the network function implemented by the network devices 105. Network configuration controller 209 is also configured to send messages to and from OSS 207. OSS 207 is configured to send and receive messages to and from network configuration controller 209, and to send and receive messages to and from the eSON gRPC client 203. The eSON gRPC client 203 is configured to send and receive messages to and from OSS 207, and to send and receive messages to and from the eSON gRPC server 205.

In some embodiments, to facilitate the communication of information indicated and/or included in various messages from the OSS 207 to the eSON gRPC server 205, and from the eSON gRPC server 205 to the OSS 207, the eSON gRPC client 203 is configured to convert messages received from the OSS 207 into a format appropriate for processing and understanding by the eSON gRPC server 205 and then sends a message in the converted format to the eSON gRPC server 205. Similarly, the eSON gRPC client 203 is configured to convert messages received from the eSON gRPC server 205 into a format appropriate for processing and understanding by the OSS 207 and then sends a message in the converted format to the OSS 207.

In some embodiments, the OSS 207 is configured to continuously monitor and configure the communication network and, as such, communicates with the network configuration controller 209 to implement changes in various network functions to operate the communication network. The OSS 207 employs the eSON gRPC client 203 and the eSON gRPC server 205 to automatically detect and resolve PCI and/or RSI mismatches, or other detectable conflicts or collisions that could interfere with the operation of the communication network, and then causes the network configuration controller 209 to execute change requests according to instructions indicating how to resolve the detected conflicts. In some embodiments, a mismatch resolution may be changing a PCI of a network device 105 and/or a cell comprising one or more network devices 105, changing a preamble, or some other suitable modification to the network function implemented by one or more network devices 105 to resolve the mismatch.

The network configuration controller 209 is configured to send and receive messages to and from the network devices 105 and relay messages to and from and/or convert messages received from the network devices 105 into a format for processing and understanding by the OSS 207 so that the OSS 207 may appropriately process the information included in such messages for sending messages to the eSON gRPC client 203. So too, in some embodiments, the OSS 207 is configured to convert messages received from the network configuration controller 209 into a format that is appropriate for processing and understanding by the eSON gRPC client 203 and then sends a message in the converted format to the eSON gRPC client 203, and to convert messages received from the eSON gRPC client 203 into a format appropriate for processing and understanding by the network configuration controller 209 and then sends a message in the converted format to the network configuration controller 209.

In some embodiments, the OSS 207 determines whether to apply the mismatch resolution generated by the eSON gRPC server 205 based on one or more rules associated with orchestrating the communication network. For example, if the OSS 207 determines that the mismatch resolution conflicts with a rule and/or would result in a change that results in less than optimal network performance according to one or more KPIs and one or more preset or dynamic thresholds for comparing the one or more KPIs, the OSS 207 may determine to allow the mismatch to exist and remain unresolved such that the first information is stored in the data storage 103 (FIG. 1) as-is, because avoiding the sub-optimal network performance outweighs the instance of the mismatch that is determined to exist.

In some embodiments, if the OSS 207 determines to reject executing the mismatch resolution, then the OSS 207 indicates to the eSON gRPC client 203 that the changing of the network function to resolve the mismatch was unsuccessful.

In some embodiments, if the OSS 207 determines to reject executing the mismatch resolution, then the OSS 207 still indicates to the eSON gRPC client 203 that the changing of the network function to resolve the mismatch was successful such that the first information or the second information that was expected to be updated in the data storage upon a successful change of the network function is unchanged in the data storage 103 and remains for a future mismatch determination process. In some embodiments, if the OSS 207 determines to reject executing the mismatch resolution, the OSS 207 also indicates that a future mismatch having the same circumstances between the first cell and the second cell is to be flagged in the data storage 103 and ignored such that if the eSON gRPC server 205 determines a future mismatch of the same circumstances exists, the eSON gRPC server 205 need not initiate the mismatch resolution process for purposes of saving system resources, for example, because the OSS 207 would again decide that the mismatch resolution, if executed, would result in less than optimal network performance.

Figure 3:
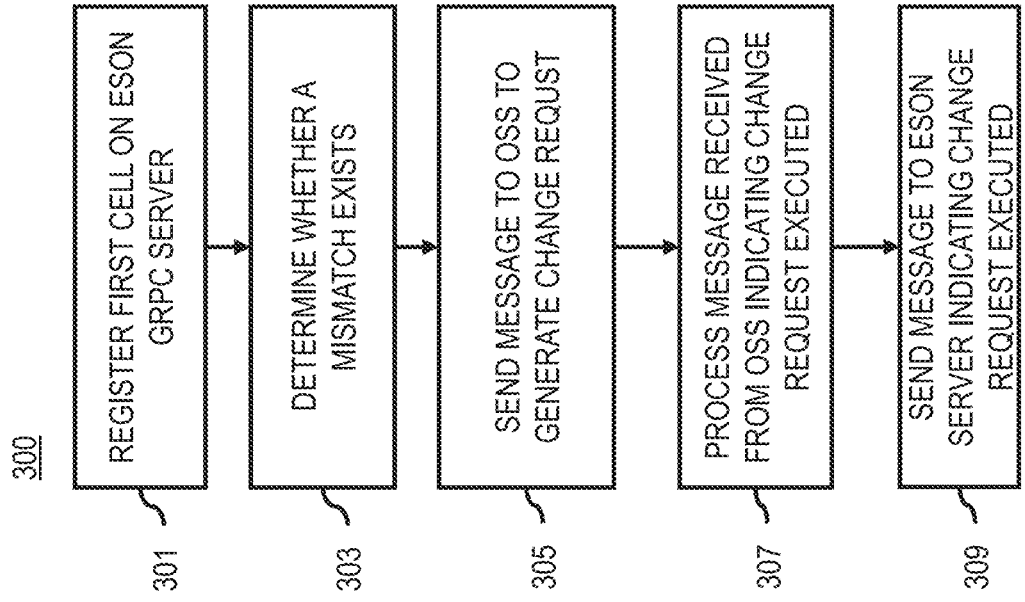
FIG. 3 is a flowchart of a cell registration and mismatch resolution process in a communication network, in accordance with one or more embodiments.

FIG. 3 is a flowchart of a process 300 for registering a cell and resolving a mismatch in a communication network, in accordance with one or more embodiments. In some embodiments, the network management platform 101 (FIG. 1) performs the process 300.

In step 301, an eSON gRPC client is caused to register a first cell in a communication network, with the first cell being registered on an eSON gRPC server communicatively coupled with the eSON gRPC client. In some embodiments, the first cell is caused to be registered on the eSON gRPC server by sending a cell registration message comprising the first information to the eSON gRPC server. In some embodiments, the cell registration message is sent from the eSON gRPC client to the eSON gRPC server by way of a gRPC API by way of a remote procedure call. In some embodiments, the cell registration message is sent from the eSON gRPC client to the eSON gRPC server by way of an add neighbor API of the gRPC client.

In step 303, first information associated with the first cell is caused to be processed by the eSON gRPC server to determine whether a mismatch exists between the first cell and a second cell in the communication network. In some embodiments, the first information is a physical cell identity (PCI) of the first cell, and the mismatch is a PCI mismatch. In some embodiments, the first information is root sequence index (RSI) of the first cell, and the mismatch is an RSI mismatch. In some embodiments, the first cell and the second cells are neighboring cells, and the first cell is added by way of a neighbor relation table.

The mismatch is determined by the eSON gRPC server based on a comparison of the first information with second information associated with the second cell. In some embodiments, the comparison of the first information with the second information is based on an output of one or more one or more SON algorithms executed by the eSON gRPC server using at least the first information an input for the one or more SON algorithms.

In step 305, in response to receiving a first message indicating the mismatch exists from the eSON gRPC server, a second message is sent indicating the mismatch exists to an OSS to cause the OSS to generate a change request to be communicated to a network configuration controller for changing a network function implemented by a network device corresponding to one of the first cell or the second cell to resolve the mismatch that exists. The change request is based on resolution information generated by the eSON gRPC server in response to determining the mismatch exists.

In step 307, a third message received from the OSS is processed. The third message indicates the change request has been executed by the network configuration controller and the changing of the network function to resolve the mismatch was successful. In some embodiments, the third message comprises updated first information or updated second information based on which one of the first cell or the second cell includes the network device that implements the network function which was changed.

In step 309, a fourth message is caused to be sent to the eSON gRPC server indicating the changing of the network function to resolve the mismatch was successful. In some embodiments, the fourth message comprises the updated first information or the updated second information to cause the eSON gRPC server to store the updated first information or the updated second information for a future mismatch determination process.

FIG. 4 is a functional block diagram of a computer or processor-based system 400 upon which or by which an embodiment is implemented.

Processor-based system 400 is programmed to register a cell and resolve a mismatch in a communication network, as described herein, and includes, for example, bus 401, processor 403, and memory 405 components.

In some embodiments, the processor-based system is implemented as a single "system on a chip." Processor-based system 400, or a portion thereof, constitutes a mechanism for performing one or more steps of registering a cell and resolving a mismatch in a communication network.

In some embodiments, the processor-based system 400 includes a communication mechanism such as bus 401 for transferring and/or receiving information and/or instructions among the components of the processor-based system 400. Processor 403 is connected to the bus 401 to obtain instructions for execution and process information stored in, for example, the memory 405. In some embodiments, the processor 403 is also accompanied with one or more specialized components to perform certain processing functions and tasks such as one or more digital signal processors (DSP), or one or more application-specific integrated circuits (ASIC). A DSP typically is configured to process real-world signals (e.g., sound) in real time independently of the processor 403. Similarly, an ASIC is configurable to perform specialized functions not easily performed by a more general-purpose processor. Other specialized components to aid in performing the functions described herein optionally include one or more field programmable gate arrays (FPGA), one or more controllers, or one or more other special-purpose computer chips.

In one or more embodiments, the processor (or multiple processors) 403 performs a set of operations on information as specified by a set of instructions stored in memory 405 related to register a cell and resolve a mismatch in a communication network. The execution of the instructions causes the processor to perform specified functions.

The processor 403 and accompanying components are connected to the memory 405 via the bus 401. The memory 405 includes one or more of dynamic memory (e.g., RAM, magnetic disk, writable optical disk, etc.) and static memory (e.g., ROM, CD-ROM, etc.) for storing executable instructions that when executed perform the steps described herein to register a cell and resolve a mismatch in a communication network. The memory 405 also stores the data associated with or generated by the execution of the steps.

In one or more embodiments, the memory 405, such as a random-access memory (RAM) or any other dynamic storage device, stores information including processor instructions for registering a cell and resolving a mismatch in a communication network. Dynamic memory allows information stored therein to be changed. RAM allows a unit of information stored at a location called a memory address to be stored and retrieved independently of information at neighboring addresses. The memory 405 is also used by the processor 403 to store temporary values during execution of processor instructions. In various embodiments, the memory 405 is a read only memory (ROM) or any other static storage device coupled to the bus 401 for storing static information, including instructions, that is not capable of being changed by processor 403. Some memory is composed of volatile storage that loses the information stored thereon when power is lost. In some embodiments, the memory 405 is a non-volatile (persistent) storage device, such as a magnetic disk, optical disk, or flash card, for storing information, including instructions, that persists even when the system 400 is turned off or otherwise loses power.

The term "computer-readable medium" as used herein refers to any medium that participates in providing information to processor 403, including instructions for execution. Such a medium takes many forms, including, but not limited to computer-readable storage medium (e.g., non-volatile media, volatile media). Non-volatile media includes, for example, optical or magnetic disks. Volatile media include, for example, dynamic memory. Common forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer can read. The term computer-readable storage medium is used herein to refer to a computer-readable medium.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
  causing, by a processor, an electronic self-organizing network (eSON) general-purpose remote procedure call (gRPC) client to register a first cell in a communication network, the first cell being registered on an eSON gRPC server communicatively coupled with the eSON gRPC client;
  causing first information associated with the first cell to be processed by the eSON gRPC server to determine whether a mismatch exists between the first cell and a second cell in the communication network, wherein the mismatch is determined by the eSON gRPC server based on a comparison of the first information with second information associated with the second cell; and
  in response to receiving a first message indicating the mismatch exists from the eSON gRPC server, sending a second message indicating the mismatch exists to an operational support system (OSS) to cause the OSS to generate a change request to be communicated to a network configuration controller for changing a network function implemented by a network device corresponding to one of the first cell or the second cell to resolve the mismatch that exists,
  wherein the change request is based on resolution information generated by the eSON gRPC server in response to determining the mismatch exists.

2. The method of claim 1, wherein the comparison of the first information with the second information is based on an output of one or more one or more self-organizing network (SON) algorithms executed by the eSON gRPC server using at least the first information an input for the one or more SON algorithms.

3. The method of claim 1, further comprising:
  processing a third message received from the OSS indicating the change request has been executed by the network configuration controller and the changing of the network function to resolve the mismatch was successful; and
  causing a fourth message to be sent to the eSON gRPC server indicating the changing of the network function to resolve the mismatch was successful.

4. The method of claim 3, wherein the third message comprises updated first information or updated second information based on which one of the first cell or the second cell includes the network device that implements the network function which was changed, and the fourth message comprises the updated first information or the updated second information to cause the eSON gRPC server to store the updated first information or the updated second information for a future mismatch determination process.

5. The method of claim 1, wherein the first information is a physical cell identity (PCI) of the first cell, and the mismatch is a PCI mismatch.

6. The method of claim 1, wherein the first information is root sequence index (RSI) of the first cell, and the mismatch is an RSI mismatch.

7. The method of claim 1, wherein the first cell and the second cells are neighboring cells, and the first cell is added by way of a neighbor relation table.

8. The method of claim 1, wherein the causing of the first cell to be registered on the eSON gRPC server comprises sending a cell registration message comprising the first information to the eSON gRPC server.

9. The method of claim 8, wherein the cell registration message is sent from the eSON gRPC client to the eSON gRPC server by way of a gRPC application programming interface (API) by way of a remote procedure call.

10. The method of claim 8, wherein the cell registration message is sent from the eSON gRPC client to the eSON gRPC server by way of an add neighbor application programming interface (API) of the gRPC client.

11. An apparatus, comprising:
  a processor; and
  a memory having instructions stored thereon that, when executed by the processor, cause the apparatus to:
  cause an electronic self-organizing network (eSON) general-purpose remote procedure call (gRPC) client to register a first cell in a communication network, the first cell being registered on an eSON gRPC server communicatively coupled with the eSON gRPC client;
  cause first information associated with the first cell to be processed by the eSON gRPC server to determine whether a mismatch exists between the first cell and a second cell in the communication network, wherein the mismatch is determined by the eSON gRPC server based on a comparison of the first information with second information associated with the second cell; and in response to receiving a first message indicating the mismatch exists from the eSON gRPC server, send a second message indicating the mismatch exists to an operational support system (OSS) to cause the OSS to generate a change request to be communicated to a network configuration controller for changing a network function implemented by a network device corresponding to one of the first cell or the second cell to resolve the mismatch that exists, wherein the change request is based on resolution information generated by the eSON gRPC server in response to determining the mismatch exists.

12. The apparatus of claim 11, wherein the comparison of the first information with the second information is based on an output of one or more one or more self-organizing network (SON) algorithms executed by the eSON gRPC server using at least the first information an input for the one or more SON algorithms.

13. The apparatus of claim 11, wherein the apparatus is further caused to:

process a third message received from the OSS indicating the change request has been executed by the network configuration controller and the changing of the network function to resolve the mismatch was successful; and cause a fourth message to be sent to the eSON gRPC server indicating the changing of the network function to resolve the mismatch was successful.

14. The apparatus of claim 13, wherein the third message comprises updated first information or updated second information based on which one of the first cell or the second cell includes the network device that implements the network function which was changed, and the fourth message comprises the updated first information or the updated second information to cause the eSON gRPC server to store the updated first information or the updated second information for a future mismatch determination process.

15. The apparatus of claim 11, wherein the first information is a physical cell identity (PCI) of the first cell, and the mismatch is a PCI mismatch.

16. The apparatus of claim 11, wherein the first information is root sequence index (RSI) of the first cell, and the mismatch is an RSI mismatch.

17. The apparatus of claim 11, wherein the first cell is caused to be registered on the eSON gRPC server in response to sending a cell registration message comprising the first information to the eSON gRPC server.

18. The apparatus of claim 17, wherein the cell registration message is sent from the eSON gRPC client to the eSON gRPC server by way of a gRPC application programming interface (API) by way of a remote procedure call.

19. The apparatus of claim 17, wherein the cell registration message is sent from the eSON gRPC client to the eSON gRPC server by way of an add neighbor application programming interface (API) of the gRPC client.

20. A non-transitory computer readable medium having instructions stored thereon that, when executed by a processor, cause an apparatus to:

cause an electronic self-organizing network (eSON) general-purpose remote procedure call (gRPC) client to register a first cell in a communication network, the first cell being registered on an eSON gRPC server communicatively coupled with the eSON gRPC client;

cause first information associated with the first cell to be processed by the eSON gRPC server to determine whether a mismatch exists between the first cell and a second cell in the communication network, wherein the mismatch is determined by the eSON gRPC server based on a comparison of the first information with second information associated with the second cell; and in response to receiving a first message indicating the mismatch exists from the eSON gRPC server, send a second message indicating the mismatch exists to an operational support system (OSS) to cause the OSS to generate a change request to be communicated to a network configuration controller for changing a network function implemented by a network device corresponding to one of the first cell or the second cell to resolve the mismatch that exists, wherein the change request is based on resolution information generated by the eSON gRPC server in response to determining the mismatch exists.

* * * * *